INVENTOR.
James W. Wilkinson
BY
ATTORNEY.

United States Patent Office 3,226,238
Patented Dec. 28, 1965

3,226,238
SEALING OR LEAKSTOP MATERIAL ADAPTED
FOR USE IN RADIATORS AND THE LIKE
James W. Wilkinson, Hastings, Mich., assignor to Hastings
Manufacturing Company, Hastings, Mich.
Filed Oct. 4, 1963, Ser. No. 313,989
5 Claims. (Cl. 106—33)

This application is a continuation in part of my application for patent, Serial No. 170,456, filed February 1, 1962, now abandoned.

This invention relates to a leak aperture closing material adapted for use in radiators and the like.

The main objects of this invention are:

First, to provide a material adapted for use in closing of leak apertures in radiators and the like which is circulated by circulation of the water in the radiator.

Second, to provide an aperture closing or sealing material having these advantages which does not plug up or stop circulation in circulation openings of a radiator or the like.

Third, to provide an aperture closing or sealing material having these features or advantages which does not dissolve or decay.

Fourth, to provide an aperture closing or sealing material having these advantages which is very economical to produce and is convenient to use.

Objects relating to details and economies of the invention will appear from the description to follow. The invention is defined and pointed out in the claims.

A preferred embodiment of the invention is illustrated in the accompanying drawing, in which:

FIG. 5 is a substantial reproduction of a sheet of material with leather fragments thereon, these fragments varying greatly in size and shape and this figure is included to illustrate that.

This application is a continuation in part of my application, Serial No. 170,456 filed February 1, 1962, and more clearly discloses important features of my invention.

This invention relates to a leak closing material adapted for use in closing or plugging leak apertures; for example in the radiators of internal combustion engines and in the coolant circulating means associated therewith. The sealing material of this invention does not plug or seal functional circulating passages or openings even though they may be of quite small diameter as is the case in some types of radiators and the circulating means associated therewith which are in quite extensive use.

In the accompanying drawing, 1 represents a radiator, 2 an inlet connection and 3 an outlet connection to the radiator, and 4 the filling cap. Walls of the radiator 1 are conventionally illustrated by the numerals 5, 6 and 7.

Figure 1:
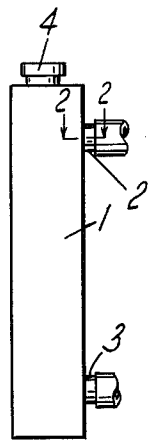
FIG. 1 is a conventional side view of a radiator having circulating inlets and outlets and a top cap for introducing water, these parts being conventionally shown.
Figure 2:
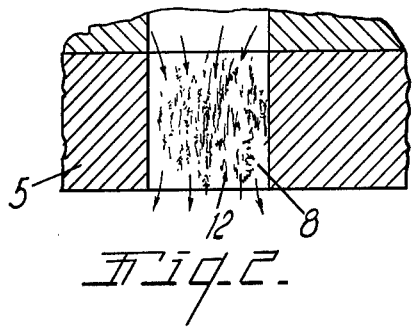
FIG. 2 is an enlarged fragmentary view on a line corresponding to line 2—2 of FIG. 1.

FIG. 2 illustrates a circulating opening such as an inlet or outlet. These inlets and outlets have smooth walls as is illustrated in FIG. 2. It is common practice for these circulating conduits to be connected to a coolant circulating means, not illustrated. The arrows of FIG. 2 indicate circulating direction. The inlet opening is indicated at 8 in FIG. 2, this being an enlarged section on line 2—2 of FIG. 1.

Figure 3:
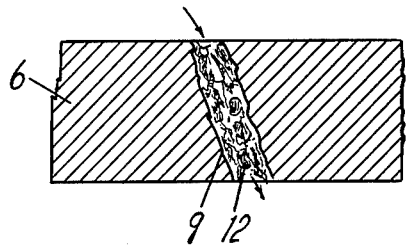
FIG. 3 is a fragmentary sectional view of a wall of the radiator having a rupture or rust formed leak opening therein partially sealed by a collection of the sealing material of the applicant's invention and illustrating how the sealing results.
Figure 4:
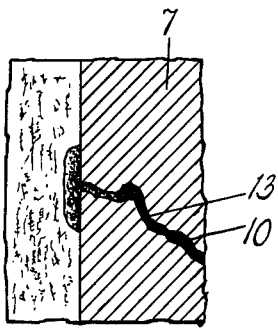
FIG. 4 is a fragmentary view of a portion of the wall of a radiator or the like with a fracture conventionally illustrated and which is plugged or sealed with the applicant's sealing material.

It is quite common for leaks, such as is indicated conventionally at 9 and 10 in FIGS. 3 and 4, to form in radiators as a result of rust or fracturing stresses and the openings may be and frequently are located so that it is impractical or very costly to seal them by soldering means. Applicant's water dispersible leak aperture closing material is commonly poured into a radiator or the like through the inlet provided for the radiator, commonly at the top thereof, as indicated at 4.

Figure 5:

The applicant's leak aperture closing and sealing material comprises a mixture of shredded leather fragments of widely varying sizes and shapes designated generally by the numeral 12 in FIGS. 2, 3 and 5. It should be understood that it is not possible to illustrate in detail the actual shapes and sizes of these leather fragments as they are of widely varying sizes and shapes. The sizes are such, however, that it is not possible to actually illustrate them in a drawing.

The applicant uses waste leather which is shredded to such size that the fragments are freely transmitted in the circulated water. These leather fibers vary greatly in size and shape as do the projecting tentacles thereon which results in their being sealingly engaged and interlocked.

In the commercial embodiment of applicant's invention, the length of the leather fragments is, generally stated in the order or range of .025 to .400 of an inch and the fragments are of irregular shape and commonly have tentacle-like portions along the length thereof. This not only results in the interlocking retaining engagement of the fibers but in their sealingly interlocking which results in the effective sealing of leak openings, which are of irregular shape, and are sealed as is indicated in FIG. 4.

FIG. 5 is a reproduction of a sheet of material with leather fragments, of the commercial embodiment of applicant's invention, scattered or distributed thereon. The purpose of this figure is to illustrate the widely varying character of the leather fragments.

It will be understood that the uprights or openings to be sealed are rarely duplicated in shape but commonly are of irregular shape resulting from fractures or rust or the like and the irregular fragments clingingly engage the rough or irregular area of the fractures and cling to each other, which results in effective sealing of the fracture.

The leather fragments 12 are mixed with soluble or emulsifiable oil in such proportion to the leather fragments as to impregnate the leather fragments with the oil, and water is added in such proportion to the leather fragments and oil as to provide a free pouring mixture. Soluble oil not only serves as a conveying means for the fragments but the fragments absorb the oil or become soaked with the oil. A desirable commercial product comprises ⅛ to ⅜ oz. of the shredded leather fragments, approximately 7 oz. of water soluble oil and approximately 8 oz. of water. The water acts to thin the slurry-like mixture of the leather fragments and oil and to facilitate pouring thereof. A desirable oil, and one which is used by the applicant's assignee, Hastings Manufacturing Company, in its commercial product is manufactured by Standard Oil Company of Indiana and is designated as "Stanicool No. 10." It is applicant's understanding that this emulsifiable product is comprised of mineral oil, petroleum soap emulsifiers, stabilizing agents, anti-rust and antifoam additives. However, applicant desires to state that there are other emulsifiable or soluble oils that are commercially available.

In commercial practice, the mixture is placed in cans or receptacles, a single can ordinarily being sufficient for radiators such as are commonly used on automobiles. Of course in larger radiators more of the mixture may be introduced. As stated, the leather fragments pass freely through smooth openings or bores such as the circulating openings shown conventionally in FIG. 2 but they engage the rough edges of fractures or openings resulting from rust, as is illustrated in FIGS. 3 and 4 which results in blocking or closing the opening as indicated at 13 in FIG. 4.

It will be understood that the thickness of the walls are greatly exaggerated in the drawings and it is not practical to illustrate the leather fragments in their actual sizes. FIG. 5 is submitted to illustrate the very great variation in the sizes and shapes of the fragments which result in effective interlocking in the aperture thereby providing a highly efficient blocking or sealing means. The irregularity of the leather fragments not only results in their interlocking engagement with the irregular or rough surfaces of the fracture but also with each other.

Another advantage is that these leather fragments do not shrink or decay under normal conditions and are not affected by antifreeze and radiator solutions that are extensively used. As used herein and in the claims, the terms "pourable" and "pouring mixture" are used to define a liquid mixture that will flow by gravity and substantially completely empty their container when poured at normal room temperatures.

As stated, I have illustrated my invention mainly in conventional form and do not attempt to illustrate various other adaptations and uses as it is believed that this disclosure will enable those skilled in the art to embody or adapt my invention to the widely varying uses for which it is adapted.

Having thus described the invention, what is claimed as new and desired to secure by Letters Patent is:

1. A water dispersible leak aperture closing material for radiators and the like consisting substantially of a mixture of approximately ⅛ to ⅜ oz. of irregular leather fragments of varying shapes and of a length within the range of .025 to .400 of an inch, approximately 7 oz. of soluble oil, and approximately 8 oz. of water, the water acting to thin the slurry-like mixture of leather particles and oil to facilitate the pouring thereof.

2. A water dispersible leak aperture closing material for radiators and the like consisting substantially of a mixture of approximately ¼ oz. of irregular shredded leather fragments of widely varying shapes, approximately 7 oz. of soluble oil, and water in excess of the quantity of the oil as to thin the mixture of leather particles and oil to free pouring condition.

3. A leak aperture closing material for radiators and the like consisting substantially of a mixture of shredded leather fragments of irregular shapes and sizes and of a length in the range of .025 to .400 of an inch, a liquid water soluble oil, and water, these ingredients being proportioned approximately ⅛ to ⅜ oz. of shredded leather fragments, approximately 7 oz. of water emulsifiable oil, and approximately 8 oz. of water, the water acting to thin the slurry-like mixture of leather fragments and oil as to provide a free pouring mixture.

4. A leak aperture closing material for radiators and the like consisting substantially of shredded leather fragments of widely varying irregular shapes and sizes not exceeding .4 of an inch in length, a water emulsifiable oil in excess of a sufficient quantity as to impregnate the leather fragments, and water in a quantity in excess of said quantity of oil to provide a pourable mixture.

5. A water circulatable leak aperture closing material for radiators and the like consisting substantially of leather fragments of widely varying shapes and sizes not exceeding .4 of an inch in maximum dimension impregnated with and mixed in a quantity of a water soluble oil in excess of that necessary to impregnate the leather, and water in a quantity in excess to said quantity of oil as to be pourable into a radiator.

References Cited by the Examiner

UNITED STATES PATENTS

| | | | |
|---|---|---|---|
| 1,906,749 | 5/1933 | Grant | 106—33 |
| 2,074,015 | 3/1937 | Clapsadle | 106—156 XR |
| 3,116,200 | 12/1963 | Young et al. | 106—156 XR |

FOREIGN PATENTS 453,555    12/1948    Canada.

ALEXANDER H. BRODMERKEL, *Primary Examiner.*